United States Patent
Sugihara

(10) Patent No.: US 10,013,819 B2
(45) Date of Patent: Jul. 3, 2018

(54) VEHICLE SPEED PATTERN DISPLAY DEVICE, PROGRAM USED THEREFOR, RUNNING TEST METHOD, AND AUTO-DRIVING DEVICE

(71) Applicant: HORIBA, Ltd., Kyoto (JP)

(72) Inventor: Yoshifumi Sugihara, Kyoto (JP)

(73) Assignee: HORIBA, Ltd., Kyoto (JP)

( * ) Notice: Subject to any disclaimer, the term of this patent is extended or adjusted under 35 U.S.C. 154(b) by 0 days.

(21) Appl. No.: 15/359,834

(22) Filed: Nov. 23, 2016

(65) Prior Publication Data

US 2017/0169629 A1  Jun. 15, 2017

(30) Foreign Application Priority Data

Dec. 10, 2015  (JP) .................................. 2015-240834

(51) Int. Cl.
  *G07C 5/08*   (2006.01)
  *G01M 17/007*  (2006.01)
(52) U.S. Cl.
  CPC ......... *G07C 5/0808* (2013.01); *G07C 5/0825* (2013.01); *G01M 17/0072* (2013.01)
(58) Field of Classification Search
  CPC ............................ G07C 5/0808; G07C 5/0825; G01M 17/0072
  See application file for complete search history.

(56) References Cited

U.S. PATENT DOCUMENTS

| 2007/0088472 A1* | 4/2007 | Ganzhorn, Jr. ..... G01M 15/102 701/31.4 |
| 2012/0242513 A1* | 9/2012 | Oguchi ............. G01M 17/0074 340/995.27 |
| 2013/0211686 A1* | 8/2013 | Shono .................... B60K 6/445 701/70 |
| 2015/0084762 A1 | 3/2015 | Okada et al. |
| 2016/0245724 A1* | 8/2016 | Sasaki ............... G01M 17/0074 |

FOREIGN PATENT DOCUMENTS

| JP | 11-160203 A | 6/1999 |
| JP | 2010-210530 A | 9/2010 |

OTHER PUBLICATIONS

EESR dated Apr. 21, 2017 issued in European patent application No. 16 199 827.3, 9 pgs.

* cited by examiner

*Primary Examiner* — Michael J Zanelli
(74) *Attorney, Agent, or Firm* — Brooks Kushman P.C.

(57) ABSTRACT

To make it possible to achieve a run under a desired condition within a predetermined allowable range, a vehicle speed pattern display device displaying upper and lower limit speed patterns and set for a predetermined prescribed speed pattern on a graph having one axis representing a vehicle speed and the other axis representing time or a running distance is adapted to display a target speed pattern different from the prescribed speed pattern on the graph.

6 Claims, 9 Drawing Sheets

VEHICLE SPEED PATTERN DISPLAY DEVICE, PROGRAM USED THEREFOR, RUNNING TEST METHOD, AND AUTO-DRIVING DEVICE

CROSS-REFERENCE TO RELATED APPLICATIONS

This application claims priority to JP Application No. 2015-240834, filed Dec. 10, 2015, the disclosure of which is incorporated in its entirety by reference herein.

TECHNICAL FIELD

The present invention relates to a vehicle speed pattern display device used for a vehicle running test, a program used for the device, a vehicle speed pattern display method, and an auto-driving device.

BACKGROUND ART

For example, in a vehicle running test done using a chassis dynamometer, as disclosed in Japanese Unexamined Patent Publication JPA-11-160203, in order to assist driving by a test driver, a vehicle speed pattern display device is used. The vehicle speed pattern display device is configured to display a prescribed speed pattern prescribed by rules such as regulations and an allowable range for the prescribed speed pattern on a graph having one axis representing time and the other axis representing speed and also display the actual vehicle speed of a vehicle on the graph.

Meanwhile, in the above-described running test, depending on a user, the user may desire to evaluate a result of running the vehicle under a desired condition within the allowable range by while making the actual vehicle speed of the vehicle fall within the allowable range, for example, driving so as to maximize an exhaust gas amount or conversely minimize the exhaust gas amount.

In such a case, a driver sufficiently experienced in the running test can run the vehicle under the desired condition only by seeing the prescribed speed pattern and the allowable range displayed on the graph. Unfortunately, a driver not sufficiently experienced in the running test cannot determine how to drive the vehicle to achieve the desired condition, and may therefore repeat a run by trial and error. Further, even after the trial and error run, when being unable to obtain a running result under the desired condition, the driver may cause the problem of being unable to do the running test.

SUMMARY OF INVENTION

Technical Problem

It is therefore the main object of the present invention to make it possible to achieve a run under a desired condition within a predetermined allowable range.

Solution to Problem

That is, a vehicle speed pattern display device according to the present invention is a vehicle speed pattern display device adapted to display upper and lower limit speed patterns set for a predetermined prescribed speed pattern on a graph having one axis representing a vehicle speed and the other axis representing time or a running distance.

In addition, the vehicle speed pattern display device displays a target speed pattern different from the prescribed speed pattern on the graph.

Since such a vehicle speed pattern display device displays the target speed pattern different from the prescribed speed pattern on the graph, even when a test driver is not sufficiently experienced in a running test, the test driver can run a vehicle under a desired condition to do the test by driving the vehicle along the target speed pattern.

In order to allow the test driver to run the vehicle under various conditions (such as a condition for maximizing an exhaust amount and a condition for minimizing the exhaust gas amount), it is desirable that the target speed pattern displayed on the graph is a speed pattern selected from among multiple speed patterns in accordance with a driving mode targeted by a user.

As a specific embodiment, one in which the target speed pattern selected in accordance with the driving mode is set such that at least one of an amount of exhaust gas, an amount of carbon dioxide contained in the exhaust gas, drivability, effectiveness of a running test result, and a running index obtained by combining them meets a desired condition can be cited.

As a specific embodiment, one in which the target speed pattern is an actual vehicle speed pattern of a vehicle acquired from the running test of the vehicle, a pattern obtained by correcting the actual vehicle speed pattern, or a pattern calculated from the prescribed speed pattern can be cited.

Also, a program for a vehicle speed pattern display device is a program instructing the display device to display upper and lower limit speed patterns set for a predetermined prescribed speed pattern on a graph having one axis representing a vehicle speed and the other axis representing time or a running distance, and the program instructs the display device to display a target speed pattern different from the prescribed speed pattern on the graph.

Further, a running test method according to the present invention is a running test method including driving a vehicle to test within a range between upper and lower limit speed patterns set for a predetermined prescribed speed pattern, and the running test method includes setting a target speed pattern different from the prescribed speed pattern.

Still further, an auto-driving device according to the present invention is one adapted to drive a vehicle within a range between upper and lower limit speed patterns set for a predetermined prescribed speed pattern, and the auto-driving device drives the vehicle in accordance with a target speed pattern different from the prescribed speed pattern.

The program for a vehicle speed pattern display device, running test method, and auto-driving device as described can produce the same working effect as that of the above-described vehicle speed pattern display device.

Advantageous Effects of Invention

According to the present invention configured as described, a run can be achieved under a desired condition within a predetermined allowable range to test.

DESCRIPTION OF EMBODIMENTS

In the following, one embodiment of a vehicle speed pattern display device according to the present invention will be described with reference to drawings.

A vehicle speed pattern display device 2 of the present embodiment is one used in a vehicle running test system 100.

First, the outline of the vehicle running test system 100 will be described.

Figure 1:
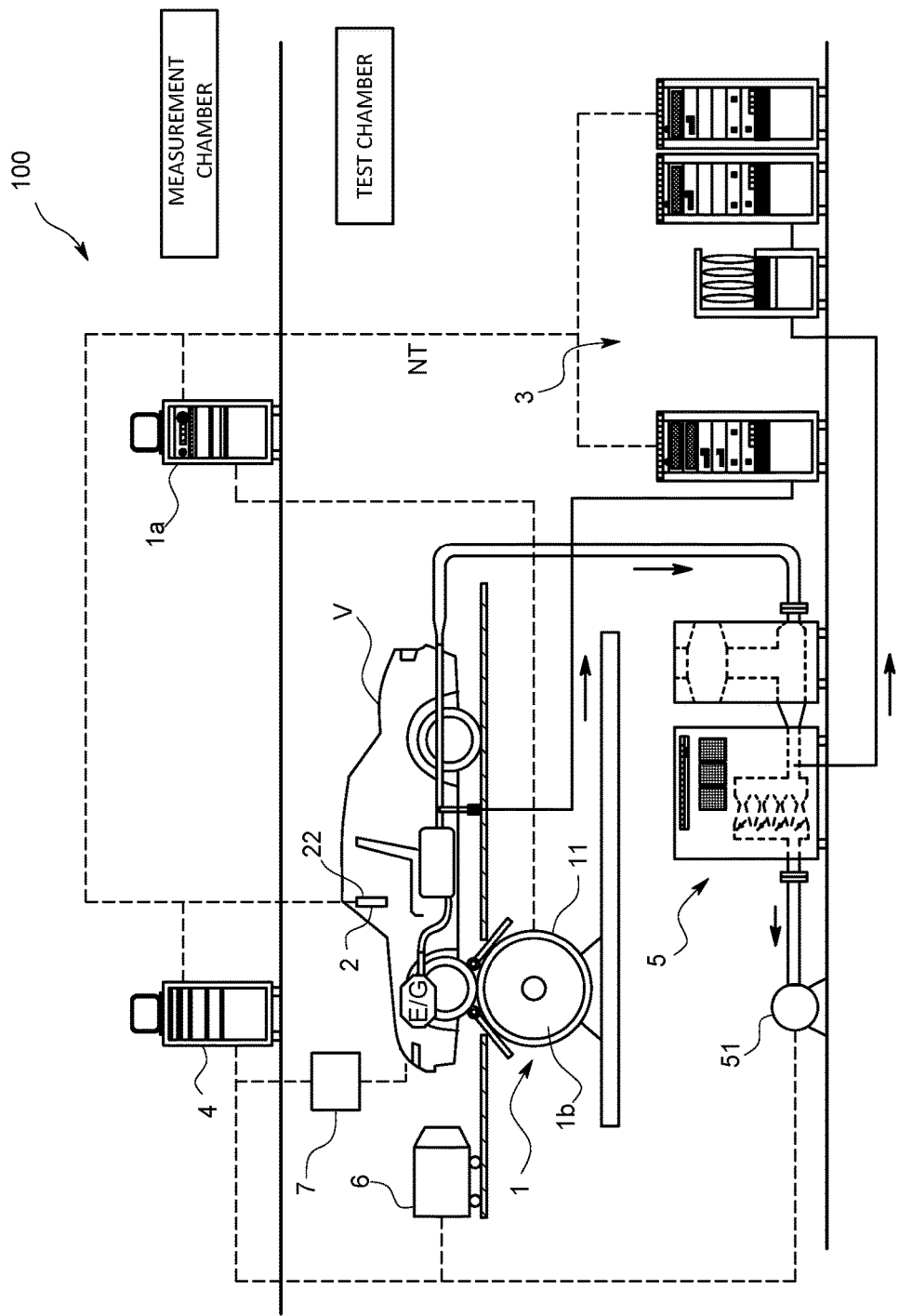
FIG. 1 is a schematic diagram illustrating the overall configuration of a vehicle test system of the present embodiment.

The vehicle running test system 100 is one for doing a running test of a vehicle in a predetermined running pattern in a chamber referred to as a cell to perform exhaust gas analysis, fuel consumption measurement, and the like of the time, and as FIG. 1 illustrates the overall configuration thereof, includes a chassis dynamometer 1, an exhaust gas measurement device 3, a measurement management device 4, a vehicle speed pattern display device 2, and the like, which are arranged separately in mutually airtightly divided measurement and test chambers.

The chassis dynamometer 1 is, for example, a uniaxial one, and includes: a dynamometer main body 1b that has a rotating drum 11 on which the driving wheels of a vehicle V are placed, and the like; and a dynamometer control device 1a that controls the drum to provide the same running load as that on a road to the vehicle V. The dynamometer control device 1a is configured using, for example, a computer system including a CPU, a memory, and the like, and has a function of being able to mutually communicate a control signal, data, and the like with the outside. Note that although FIG. 1 illustrates the chassis dynamometer for 2 WD and FF vehicles, needless to say, the chassis dynamometer 1 may be, of course, one including a pair of rotating drums 11 at the front and rear so as to be made available for 4 WD vehicles, or a biaxial one.

The exhaust gas measurement device 3 includes multiple gas analyzers having different measurement principles, and is capable of continuously and separately measuring respective components contained in engine exhaust gas, such as HC, $NO_x$, CO, and CO2. Note that the present embodiment is configured to be able to also measure the weights of components such as CO, HC, and NO per unit running distance by combining with an exhaust gas constant volume sample sampling device 5 adapted to sample diluted exhaust gas, which results from diluting the exhaust gas with ambient air, at a constant volume as sample gas. The exhaust gas measurement device 3 includes a computer system configured using a CPU, a memory, and the like, and has a function of being able to mutually communicate a control signal, data, and the like with the outside.

The measurement management device 4 is, for example, a computer system having: a body including a CPU, memory, communication port, and the like; and a console including a display, input means, and the like. In addition, the measurement management device 4 is adapted to be able to transceive data with the dynamometer control device 1a and the exhaust gas measurement device 3 through a network NT such as a LAN, and thereby comprehensively control the dynamometer control device 1a, the exhaust gas measurement device 3, and other equipment (such as a vehicle cooling fan 6, vehicle information acquisition device 7, exhaust gas suction blower 51, and indoor air conditioner) and acquire data.

Describing specifically, in the body of the measurement management device 4, the respective pieces of equipment (equipment is a concept including devices or elements constituting the devices) are registered, and the body is adapted to be able to display operating states of the registered pieces of equipment, measurement results, alarm information, and the like on the display as numerical values, characters, graphics, and the like, as well as controlling the operating states of the respective pieces of equipment, and the like using the input means. The controlling refers to, for example, in the case of the chassis dynamometer 1, starting/stopping an action, setting/changing a load, or the like, and in the case of the exhaust gas measurement device 3, initially setting the respective analyzers, starting/stopping measurement, changing measurement conditions, calibrating, turning ON/OFF the blower 51, or the like.

Further, here, the measurement management device 4 also includes a control part 41 capable of transceiving data with the vehicle speed pattern display device 2 through the network NT such as a LAN, and controlling the vehicle speed pattern display device 2 to acquire data. Unfortunately, without limitation to this, separately from the measurement management device 4, the control part 41 for the vehicle speed pattern display device 2 may be provided.

The vehicle speed pattern display device 2 includes: a body 21 that has a CPU and a memory; a display 22 that is placed inside or outside the vehicle, for example, near a windshield so as to be viewable by a test driver; and input means 23, and gives assistance when the test driver runs the vehicle. In addition, the input means 23 here include, for example, a touch panel and a remote controller integrally attached to the display 22.

Figure 2:
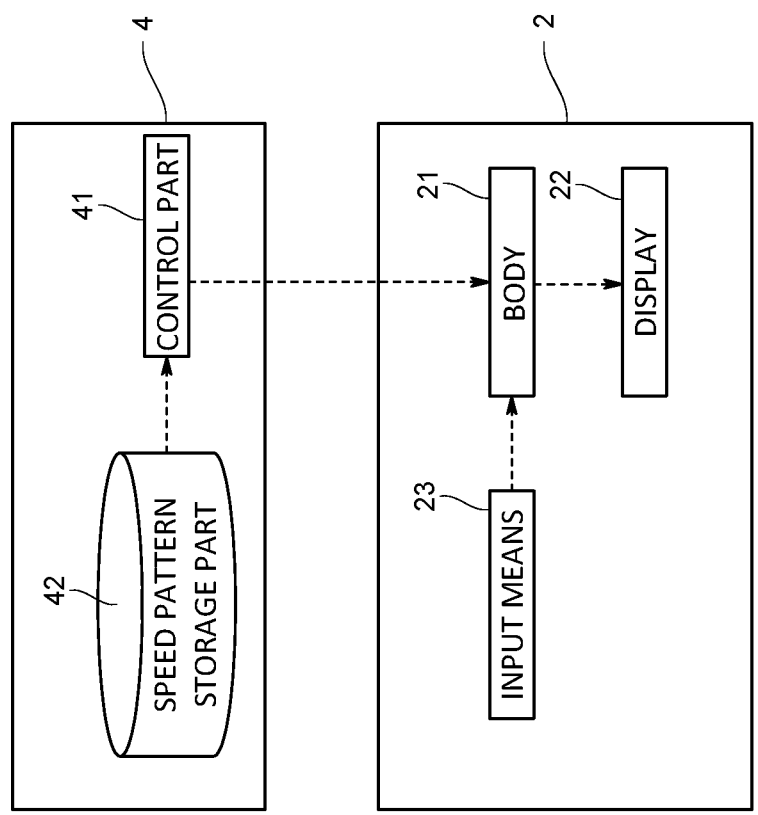
FIG. 2 is a diagram explaining a measurement management device and a vehicle speed pattern display device of the present embodiment.
Figure 3:
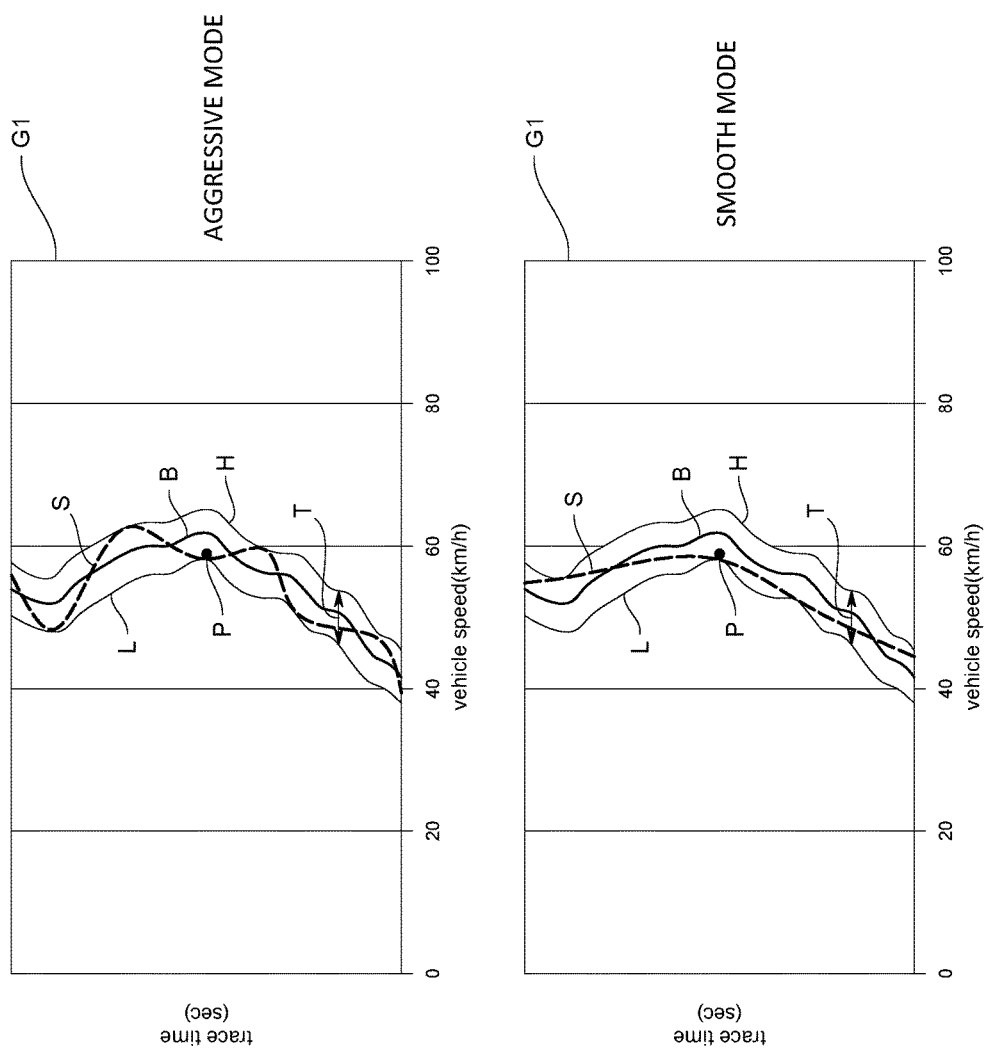
FIG. 3 is a diagram explaining content displayed by the vehicle speed pattern display device of the present embodiment.
Figure 4:
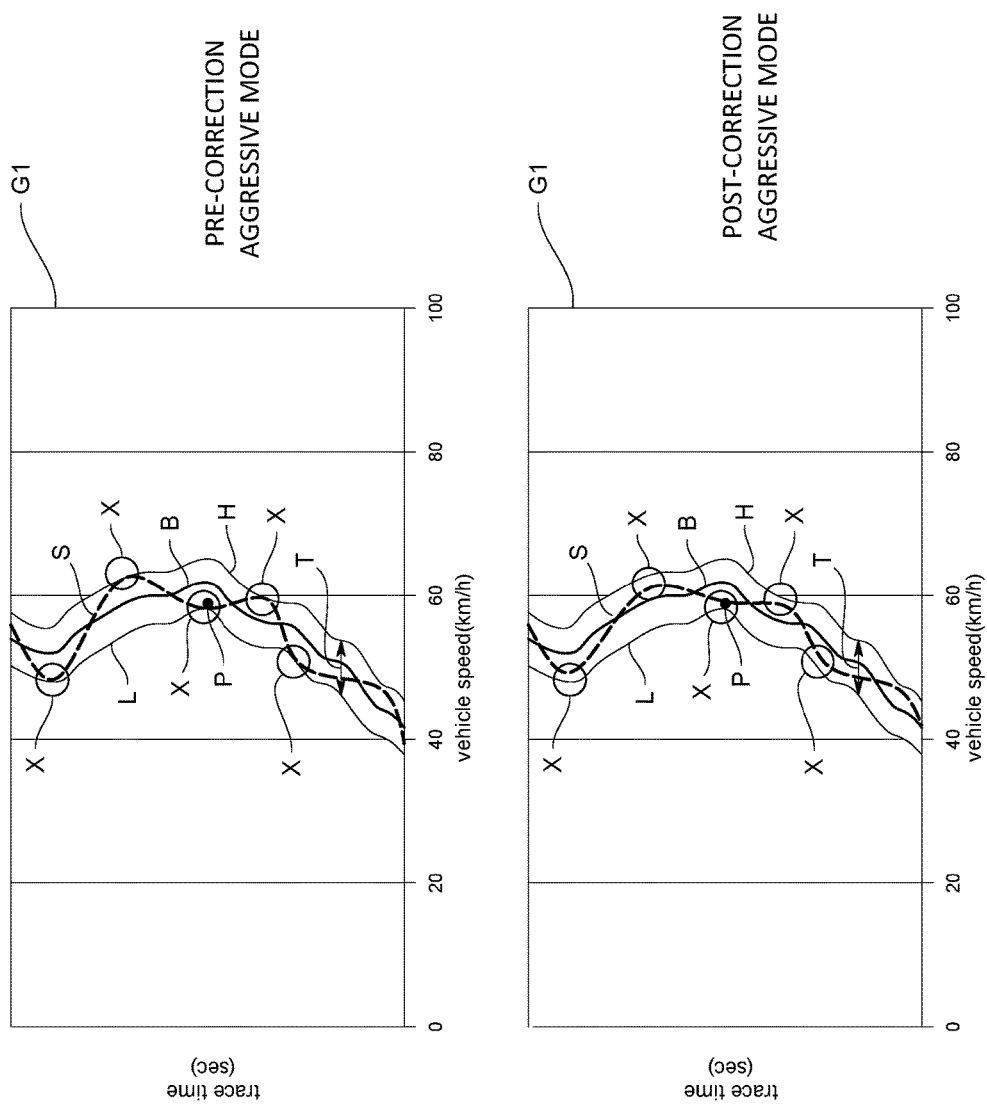
FIG. 4 is a diagram explaining content displayed by the vehicle speed pattern display device in the present embodiment.

Specifically, the vehicle speed pattern display device 2 is such that the body 21 acquires a control signal from the control part 41, and on the basis of the control signal, as illustrated in FIGS. 2 to 4, displays a graph G1 with the vertical axis representing time and the horizontal axis representing a vehicle speed (and vice versa in terms of axis) on a screen of the display 22 as well as displaying a prescribed speed pattern B prescribed by rules such as regulations, and upper and lower limit speed patterns H and L set for the prescribed speed pattern B.

The respective speed patterns B, H, and L are related to a predetermined running pattern provided under rules such as regulations and then registered in a speed pattern storage part 42 preliminarily set in a predetermined area of the memory of the measurement management device 4.

As an example of these patterns, FIG. 3 or 4 illustrates respective speed patterns B, H, and L that are set such that vehicle speeds irregularly change along the time axis; unfortunately, the respective speed patterns B, H, and L are not limited to the illustrated shapes.

Note that a user such as the test driver can newly register or change the respective speed patterns B, H, and L using the input means of the measurement management device 4.

The vehicle speed pattern display device 2 displays a marker P indicating an actual vehicle speed of the moment. The actual vehicle speed is obtained by acquiring a dynamometer roller speed from the chassis dynamometer 1 and converting the dynamometer roller speed to the speed of the vehicle V.

Note that in any of the graphs G1 in FIGS. 3 and 4, the upper side corresponds to a future side, and the vehicle speed pattern display device 2 displays the graph G1 while scrolling the graph G1 so as to position the marker P near the center of the time axis (the vertical axis here) of the graph G1.

In doing so, the test driver or the like can drive while viewing the respective speed patterns B, H, and L and marker P displayed on the graph G1 such that the actual vehicle speed falls within the range (hereinafter also referred to as a tolerance T) between the upper limit speed pattern H and the lower limit speed pattern L.

In addition, the vehicle speed pattern display device 2 displays of the present embodiment a target speed pattern S set within the range (the tolerance T) between the upper limit speed pattern H and the lower limit speed pattern L on the graph G1 separately from the prescribed speed pattern B.

The target speed pattern S is related to multiple driving modes preliminarily set by a user, and then stored in the speed pattern storage part 42 preliminarily set in the predetermined area of the memory of the measurement management device 4.

Note that the driving modes refer to running methods that are set such that the vehicle V can make runs meeting predetermined conditions, respectively, and specifically include some modes such as an aggressive mode set so as to maximize an exhaust gas amount and a smooth mode set so as to minimize the exhaust gas amount. The aggressive mode is a driving mode represented by a speed pattern in which, for example, an accelerator or a brake is greatly operated so as to increase acceleration, and thereby the speed is greatly varied within the tolerance T. Also, the smooth mode is a driving mode represented by a speed pattern in which, for example, the operation amount of the accelerator or the brake is decreased so as to decrease the acceleration, and thereby a variation in the speed within the tolerance T is decreased.

When a user such as the test driver selects at least one driving mode using the input means of the measurement management device 4 from among such driving modes, the vehicle speed pattern display device 2 displays a target speed patterns S corresponding to the selected driving mode on the graph G1.

Note that when the user selects multiple driving modes, the vehicle speed pattern display device 2 displays the multiple driving modes on the graph G1, for example, sequentially in selected order.

In the upper stage of FIG. 3, the target speed pattern S displayed when the aggressive mode is selected is illustrated. As can be seen from the graph G1 in the upper stage, the target speed pattern S in the aggressive mode is set such that at the time of acceleration, the vehicle speed is accelerated to the upper limit speed pattern H or to the vicinity of the upper limit speed pattern H, and at the time of deceleration, the vehicle speed is decelerated to the lower limit speed pattern L or to the vicinity of the lower limit speed pattern L. In other words, the target speed pattern S is set so as to repeat sudden acceleration and sudden deceleration within the tolerance T to increase the exhaust gas amount.

On the other hand, in the lower stage of FIG. 3, the target speed pattern S displayed when the smooth mode is selected is illustrated. As can be seen from the graph G1 in the lower stage, the target speed pattern S in the smooth mode is set such that at the time of acceleration, the vehicle speed is accelerated to the lower limit speed pattern L or to the vicinity of the lower limit speed pattern L, and at the time of deceleration, the vehicle speed is decelerated to the upper limit speed pattern H or to the vicinity of the upper limit speed pattern H. In other words, the target speed pattern S is set so as to decrease a variation in the vehicle speed within the tolerance T to decrease the exhaust gas amount.

Here, the above-described target speed patterns S are ones that respectively meet conditions for the respective driving modes and are preliminarily selected and stored by a user from among actual vehicle speed patterns acquired in past running tests.

Note that for one driving mode, multiple mutually different actual vehicle speed patterns may be stored, or only the most suitable actual vehicle speed pattern resulting in a run closest to a condition may be stored.

The present embodiment is adapted such that a user such as the test driver can appropriately correct a target speed pattern S stored in the speed pattern storage part 42 using, for example, the input means of the measurement management device 4.

As an example of the correction, a result of correcting the above-described target speed pattern S in the aggressive mode is illustrated in FIG. 4.

This example is configured to be able to make the correction toward the center of the tolerance T so as to separate a boundary adjacent point X (a point surrounded by a circle in FIG. 4) close to the upper or lower limit speed patterns H or L in the target speed pattern S from the upper or lower limit speed pattern H or L toward the prescribed speed pattern B.

In doing so, the test driver can prepare a target speed pattern S corresponding to his/her driving skill, and therefore run the vehicle V in a condition close to desired conditions while preventing the actual vehicle speed from getting out of the tolerance T.

Figure 5:
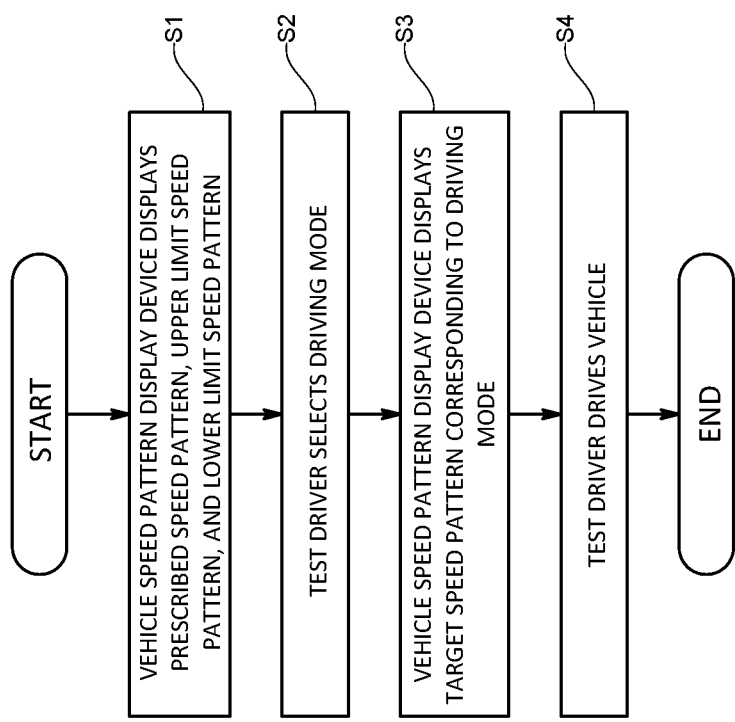
FIG. 5 is a flowchart explaining a test method of the present embodiment.

A running test procedure using the above-described vehicle speed pattern display device 2 will be briefly described with reference to a flowchart in FIG. 5.

First, a user such as the test driver uses the input means of the measurement management device 4 to select a running pattern, and graphically displays a prescribed speed pattern B, an upper limit speed pattern H, and a lower limit speed pattern L registered in the running pattern on the display of the vehicle speed pattern display device 2 (S1).

Then, the test driver uses the input means of the measurement management device 4 to select a desired driving mode from among the multiple types (S2), and on the display, graphically displays a target speed pattern S that is stored corresponding to the driving mode (S3).

In doing so, the test driver can run the vehicle V to drive so as to control the actual vehicle speed along the target speed pattern S while viewing the respective speed patterns B, H, and L and marker P displayed in a graph G1 on the display 22 (S4).

The vehicle speed pattern display device 2 according to the present embodiment configured as described can display a target speed pattern S corresponding to a driving mode on the display 22 when a test driver selects the driving mode.

In doing so, even when the driver is not sufficiently experienced in the running test, the driver drives so as to bring the actual vehicle speed close to the target speed pattern S displayed on the display, and can thereby achieve a desired running condition such as a condition for a run producing a large amount of exhaust gas or a condition for a run producing a small amount of exhaust gas.

This makes it possible to reproduce a run under a desired condition without relying on a test driver sufficiently experienced in the running test, and evaluate the result of the run.

Note that the present invention is not limited to the above-described embodiment.

For example, in the above-described embodiment, each of the speed patterns graphically displayed is such that the vehicle speed irregularly changes along the time axis. Unfortunately, each of the speed patterns B, H, and L may be such that as illustrated in FIG. 6, the vehicle speed is expressed by a function using time or a running distance as a parameter, or regularly changes along the time axis.

In this case, a target speed pattern S may be, for example, one calculated from the prescribed speed pattern B on the basis of a predetermined algorithm.

Figure 6:
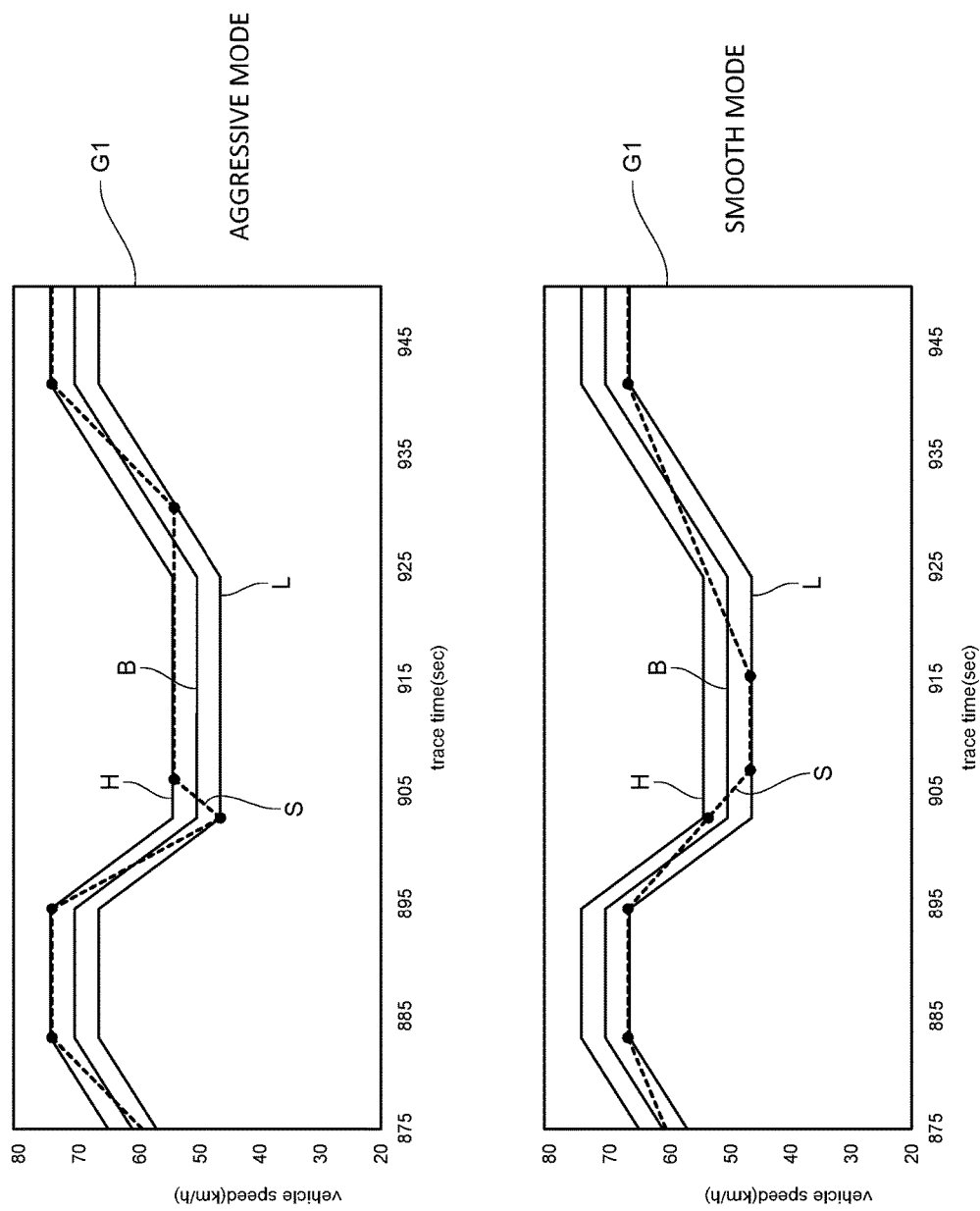
FIG. 6 is a diagram explaining content displayed by a vehicle speed pattern display device of a variation.

In addition, in the upper stage of FIG. 6, the target speed pattern S in the aggressive mode is illustrated, and in the lower stage of FIG. 6, the target speed pattern S in the smooth mode is illustrated.

In the above-described configuration, each of the target speed patterns S is desirably calculated using a closeness degree (also referred to as an aggressiveness level) indicating closeness to the upper speed pattern H or the lower speed pattern L.

More desirably, a configuration in which a user can set the aggressiveness level stepwise can be cited, and specifically, a possible embodiment is one adapted to calculate the target speed pattern S using a parameter such as the difference between the target speed pattern S and the upper limit speed pattern H, the difference between the target speed pattern S and the lower limit speed pattern L, or a variation in the target speed pattern S depending on the selected aggressiveness level.

This allows the test driver to calculate a comfortably runnable target speed pattern S by inputting the aggressiveness degree using the input means of the measurement management device 4 in consideration of his/her driving skill. In doing so, it becomes possible for the test driver to comfortably run the vehicle under a condition close to a desired condition within the tolerance.

Figure 7:
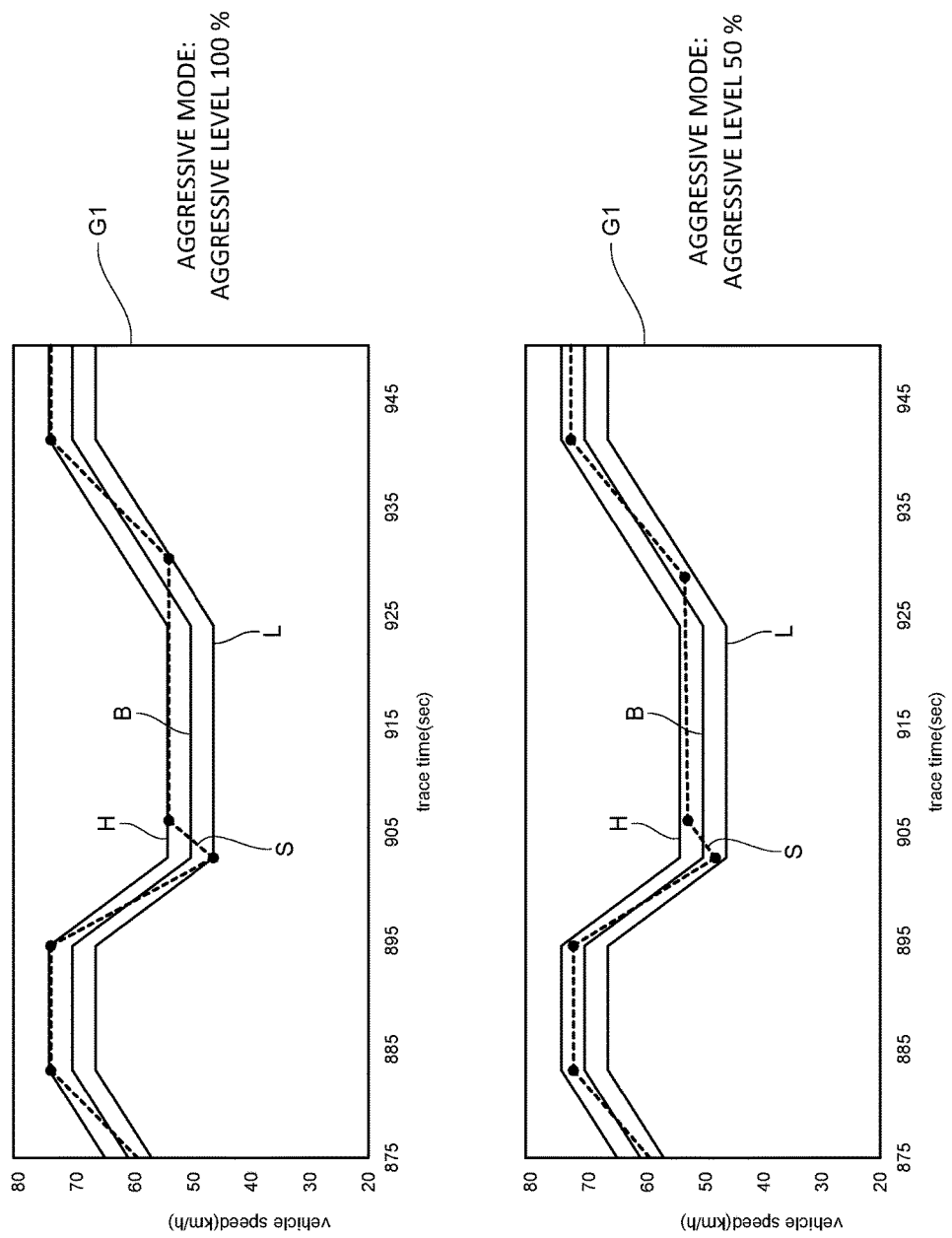
FIG. 7 is a diagram explaining content displayed by a vehicle speed pattern display device of another variation.

In addition, FIG. 7 illustrates target speed patterns S in the aggressive mode obtained when the above-described aggressiveness level is 100% and 50%.

Also, in the above-described embodiment, as the driving mode, the aggressive or smooth mode set such that an exhaust gas amount meets a desired condition is described. Unfortunately, various driving modes may be set such that for example, any of a carbon dioxide amount, drivability, the effectiveness of a running test result, an accelerator opening level, a brake stepping amount, and the like, or a running index combining all or some of them meets a corresponding desired condition.

Figure 8:
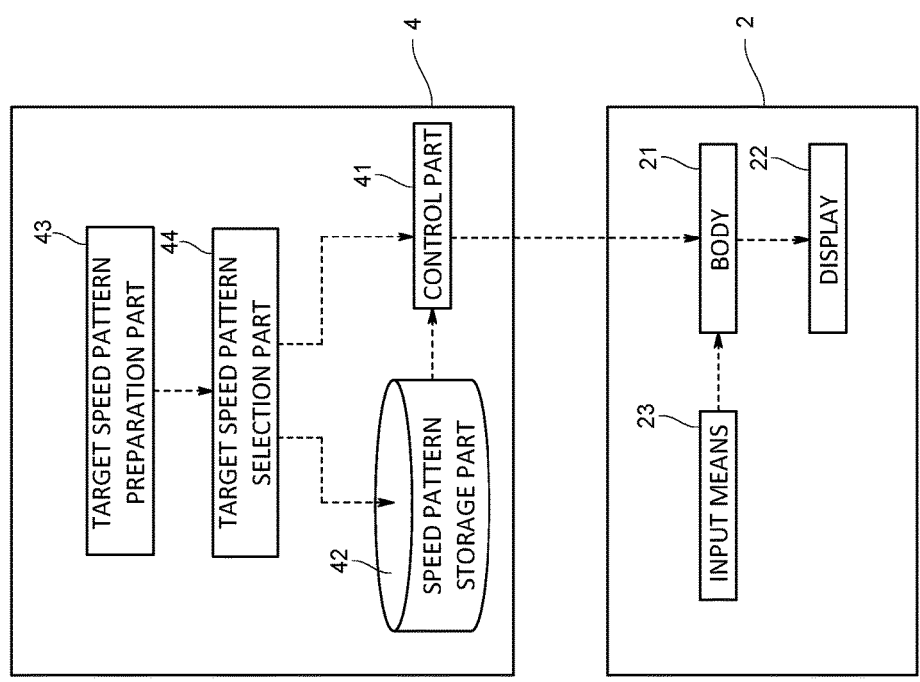
FIG. 8 is a diagram explaining a measurement management device and a vehicle speed pattern display device of still another variation.

In this case, as illustrated in FIG. 8, it is desirable that the measurement management device 4 further includes functions as a target speed pattern preparation part 43 and a target speed pattern selection part 44.

The target speed pattern preparation part 43 prepares a target speed pattern S using a driving index (prescribed by SAE or the like) indicating, for example, the deviation ratio between the prescribed speed pattern B and the target speed pattern S, or the like as the drivability.

The driving index is an index such as an ER (Energy Rating), DR (Distance Rating), EER (Energy Economy Rating), ASCR (Absolute Speed Change Rating), IWR (Inertial Work Rating), or RMSSE (Root Mean Squared Speed Error). The target speed pattern preparation part 43 prepares multiple target speed patterns S in the aggressive mode and/or multiple target speed patterns S in the smooth mode on the basis of one or more values corresponding to one or more sets of the above indices. For example, when preparing the target speed patterns S in the aggressive mode or the smooth mode, the target speed pattern preparation part 43 determines driving indices corresponding to the aggressive mode or the smooth mode and corresponding numerical values. Then the target speed pattern preparation part 43 prepares multiple target speed patterns S in which the accelerator opening level and the brake stepping amount, or the timings of them are made different to the extent that the determined indices fall within ranges around the corresponding numerical values. The multiple target speed patterns S are of course prepared so as to fall within the tolerance T.

The target speed pattern selection part 44 selects a target speed pattern S most suitable for a target run from among the multiple target speed patterns S prepared by the target speed pattern preparation part 43. For example, from among the multiple target speed patterns S, the target speed pattern selection part 44 selects one in which one or both of a variation in the accelerator opening level and a variation in the brake stepping amount are the smallest. Alternatively, from among the multiple target speed patterns S, the target speed pattern selection part 44 may select one in which the number of times of stepping on one or both of the accelerator and the brake is the smallest. Conditions for these types of selection can be arbitrarily set by a user. In doing so, from among the multiple target speed patterns S, the target speed pattern selection part 44 can select one along which the test driver can easily drive.

In addition, the target speed pattern S selected by the target speed pattern selection part 44 is stored in the speed pattern storage part 42. Alternatively, the selected target speed pattern S is transmitted from the control part 41 to the vehicle speed pattern display device 2.

In the above-described configuration, since the target speed pattern preparation part 43 prepares target speed patterns S in the aggressive and/or smooth modes on the basis of values of driving indices, a desired running condition such as a condition for a run producing a large amount of exhaust gas or a condition for a run producing a small amount of exhaust gas can be achieved and at the same time the reproducibility of the desired running condition can be improved.

Further, in the vehicle speed pattern display device, a function as the console may be left, and a substantial arithmetic circuit may be made carried by the measurement management device. In doing so, pieces of data can be centrally managed.

In addition, the control part and the speed pattern storage part may be provided outside the measurement management device (such as in the vehicle speed pattern display device).

Further, the above-described embodiment is adapted such that the test driver drives along a target speed pattern, but may be adapted such that an auto-driving device drives the vehicle along a target speed pattern determined within the range between the upper limit speed pattern and the lower limit speed pattern separately from the prescribed speed pattern.

Figure 9:
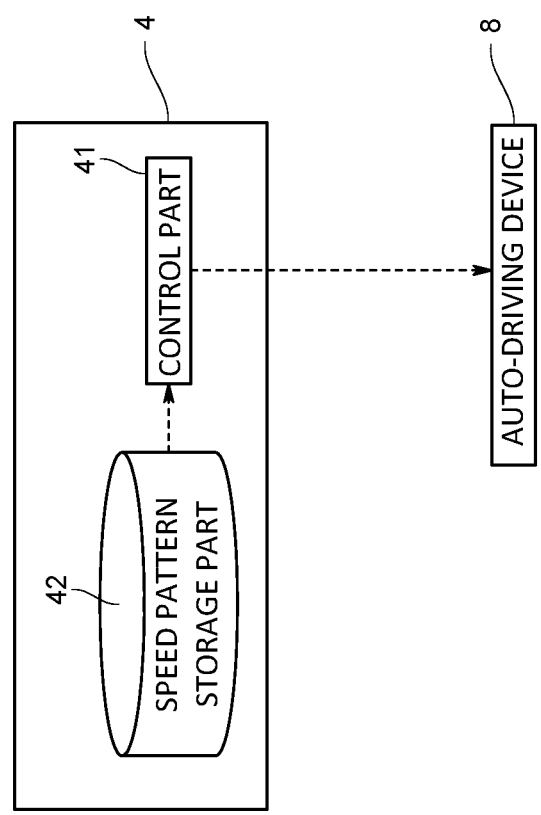
FIG. 9 is a diagram explaining an auto-driving device of yet another variation.

As a specific embodiment, as illustrated in FIG. 9, a configuration adapted such that the control part 41 of the measurement management device 4 controls the auto-driving device 8 on the basis of the target speed pattern stored in the speed pattern storage part 42 can be cited.

Also, the vehicle speed pattern display device may be one that without displaying the prescribed speed pattern, in addition to the upper limit speed pattern and the lower limit speed pattern, graphically displays a target speed pattern different from the prescribed speed pattern on the display.

Further, a target speed pattern is not necessarily determined within the range between the upper limit speed pattern and the lower limit speed pattern. For example, when the actual vehicle speed is allowed to get out of the tolerance within the predetermined number of times or a predetermined accumulated time, part of the target speed pattern may be set outside the tolerance.

Besides, it goes without saying that the present invention is not limited to any of the above-described embodiment and variations, but can be variously modified without departing from the scope thereof.

REFERENCE SIGNS LIST

100: Vehicle running test system
2: Vehicle speed pattern display device
G1: Graph
B: Prescribed speed pattern
H: Upper limit speed pattern
L: Lower limit speed pattern
S: Target speed pattern

What is claimed is:

1. A vehicle speed pattern display device adapted to display on a graph having an axis representing vehicle speed and another axis representing time or running distance
   upper and lower limit speed pattern traces set to define a tolerance band for a prescribed speed pattern trace, and
   a target speed pattern trace different than the prescribed speed pattern trace, wherein the target speed pattern trace corresponds to a driving mode targeted by a user or is calculated from the prescribed speed pattern trace.

2. The vehicle speed pattern display device according to claim 1, wherein
   the target speed pattern trace is selected in accordance with the driving mode and is set such that at least one of an amount of exhaust gas, an amount of carbon dioxide contained in the exhaust gas, drivability, effectiveness of a running test result, and a running index obtained by combining them meets a desired condition.

3. The vehicle speed pattern display device according to claim 1, wherein
   the target speed pattern trace is derived from actual vehicle speeds of a vehicle acquired from a running test of the vehicle, or obtained by correcting the actual vehicle speeds.

4. A running test method comprising:
   driving a vehicle to test within a speed range defined by upper and lower limit speed pattern traces that are set as a tolerance band for a prescribed speed pattern trace,
   setting a target speed pattern trace different than the prescribed speed pattern trace, wherein the target speed pattern trace corresponds to a driving mode targeted by a user or is calculated from the prescribed speed pattern trace; and
   displaying the target speed pattern trace on a display.

5. An auto-driving device comprising:
   one or more controllers adapted to drive a vehicle
      within a speed range defined by upper and lower limit speed pattern traces that are set for a prescribed speed pattern trace, and
      in accordance with a target speed pattern trace different than the prescribed speed pattern trace, wherein the target speed pattern trace corresponds to a driving mode targeted by a user or is calculated from the prescribed speed pattern trace.

6. A non-transitory computer readable program product for a vehicle speed pattern display device including instructions that when executed by a computer cause the vehicle speed pattern display device to display on a graph having an axis representing vehicle speed and another axis representing time or running distance
   upper and lower limit speed pattern traces set to define a tolerance band for a prescribed speed pattern trace, and
   a target speed pattern trace different than the prescribed speed pattern trace, wherein the target speed pattern trace corresponds to a driving mode targeted by a user or is calculated from the prescribed speed pattern trace.

* * * * *